Dec. 22, 1936.   F. O. ALBERTSON   2,065,486
VALVE SEAT TOOL
Original Filed July 17, 1931   3 Sheets-Sheet 1

Inventor:
Frans O. Albertson
By Williams, Bradbury,
McCaleb & Hinkle.
Attys.

Dec. 22, 1936.    F. O. ALBERTSON    2,065,486
VALVE SEAT TOOL
Original Filed July 17, 1931    3 Sheets-Sheet 2

Dec. 22, 1936.                F. O. ALBERTSON                2,065,486
                              VALVE SEAT TOOL
                 Original Filed July 17, 1931      3 Sheets-Sheet 3

Patented Dec. 22, 1936

2,065,486

UNITED STATES PATENT OFFICE 2,065,486

VALVE SEAT TOOL

Frans O. Albertson, Sioux City, Iowa, assignor to Albertson & Company, Inc., Sioux City, Iowa, a corporation of Iowa Application July 17, 1931, Serial No. 551,310
Renewed November 16, 1936

10 Claims. (Cl. 77—2)

The present invention relates to valve seat tools and is particularly concerned with valve seat tools adapted to be used in refinishing or reconstructing the valve seats of internal combustion engines.

The present tools are peculiarly adapted to be used in cutting an annular recess in the valve seat of an internal combustion engine, for receiving a new valve seat ring, for repairing the valve seat or furnishing it with a ring seat having more desirable characteristics than the metal of which the motor block is constructed.

One of the objects of the present invention is the provision of an improved valve seat tool assembly, by means of which valve seats and ring recesses may be cut more accurately than with the devices of the prior art.

Another object is the provision of an improved power actuated valve seat tool, by means of which valve seats or ring recesses may be cut more quickly and uniformly, thereby saving time and labor.

Another object is the provision of an improved power drive unit, by means of which the applicant's standard drill motor may be utilized for driving the cutter of a ring tool set.

Another object is the provision of an improved automatic feed, by means of which the cutter is automatically fed downward at a predetermined rate of cut, thereby preventing any overworking of the cutter, or binding of the tool in its bearings, and eliminating the necessity for manual manipulation of the cutter feed.

Another object is the provision of an automatic feed screw of the type described, which may be utilized in the valve seat tool sets covered by my prior applications.

Another object is the provision of an improved power actuated valve seat tool assembly, which is adapted to cut valve seats or ring recesses in accurately concentrical position with respect to the axis of a valve guide.

Another object is the provision of an improved valve seat tool set, which is sturdy, capable of being economically manufactured, and capable of long and efficient service with a minimum amount of repair or replacement.

Other objects and advantages of the invention will be apparent from the following description, and from the accompanying drawings, in which similar characters of reference indicate similar parts throughout the several views.

Referring to the drawings, of which there are three sheets.

Figures 1, 2:
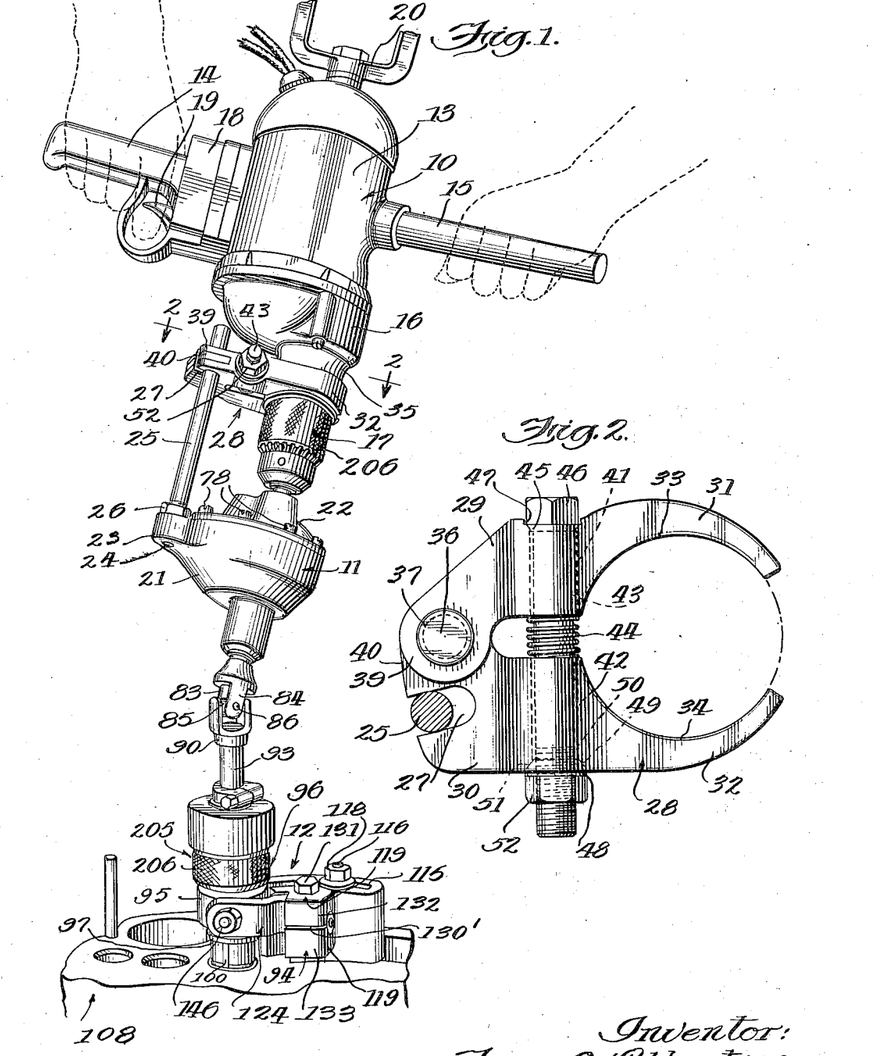
Fig. 1 is a view in perspective of the complete valve seat tool assembly in the process of cutting a recess for a valve seat ring.
Fig. 2 is a plan view of the clamp and floating stud for preventing rotation of the power drive gear casing without binding the drive shaft, taken on the plane of the line 2—2 of Fig. 1.

The complete power actuated valve seat tool assembly shown in Fig. 1, preferably comprises the motor indicated in its entirety by the numeral 10, the power drive unit 11, and the valve seat tool fixture 12.

The power unit or motor 10 preferably comprises the applicant's motor drill unit, which consists of an electric motor 13 having a pair of oppositely located transverse handles 14 and 15, the casing 13 containing a series motor of the commutator type, which is connected by appropriate gear reduction mechanism in the gear casing 16, with the shaft of a chuck 17.

The motor casing 13 includes a switch casing 18 containing a latch-trip or snap switch adapted to be actuated by the trigger 19 adjacent the handle 14, and the gear reduction casing 16 preferably includes reduction gears for reducing the speed from that of the motor shaft to the appropriate speed for a drill at the chuck 17. For example, these gears may consist of a motor shaft pinion, an enlarged gear meshing said pinion, a second pinion driven by said enlarged gear, and a second enlarged gear carried by the shaft of chuck 17. The motor 10 may also be provided with a so-called "spade" handle fixture 20 located on the upper end of the motor for more convenient manipulation under certain conditions.

Figure 6:
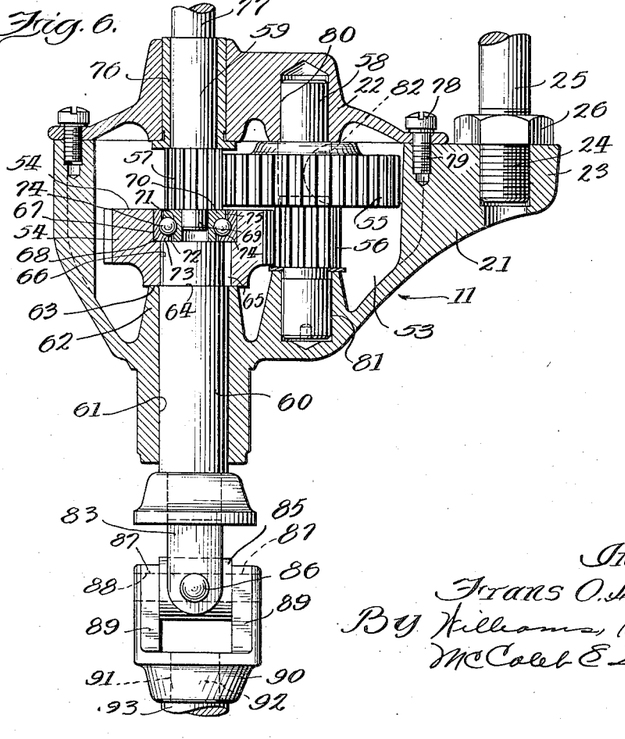
Fig. 6 is a vertical, sectional view taken through the axis of the shafts of the power drive shown in Fig. 1.

The speed at which a drill chuck should be driven would be too fast for the operation of a valve seat cutting tool and in order to utilize the same motor as a power drive for drilling and for valve seat work, the tool assembly is preferably provided with a power drive unit 11, the details of which are shown in section in Fig. 6.

The power drive unit 11 comprises a casing which may consist of upper and lower castings 22, 21 for enclosing the gears and shafts and providing appropriate bearings for these machine elements. The lower power drive casting 21 is preferably provided with a laterally projecting portion 23 which has a threaded bore 24 for receiving a stud bolt or rod 25. A lock nut 26 on the bolt 25 assures the fixety of this bolt in the casting 21, and the bolt projects upward for engagement in a slot 27 formed in a clamping fixture indicated in its entirety by the numeral 28.

The clamping fixture 28 consists of a pair of clamping members 29 and 30 formed with oppositely located jaws 31 and 32, and these clamping members may be constructed of cast metal. The jaws 31 and 32 have inner cylindrical surfaces 33, 34, which may be substantially complementary to the outer cylindrical surface 35 of the motor gear casing 16 above the chuck 17. The clamping members 29 and 30 are pivoted together by a bolt or pin 36 passing through the registering bores 37 in the clamping members 29 and 30, and axial movement of the clamping members 29 and 30 on the bolt 36 is limited by the head of the bolt at one end and a cotter pin at the other end of the bolt.

The clamping member 29 is preferably bifurcated as at 39 adjacent the bolt 37, for receiving the portion 40 of the clamping member 30 between the bifurcated portions 39.

Figures 3, 5:
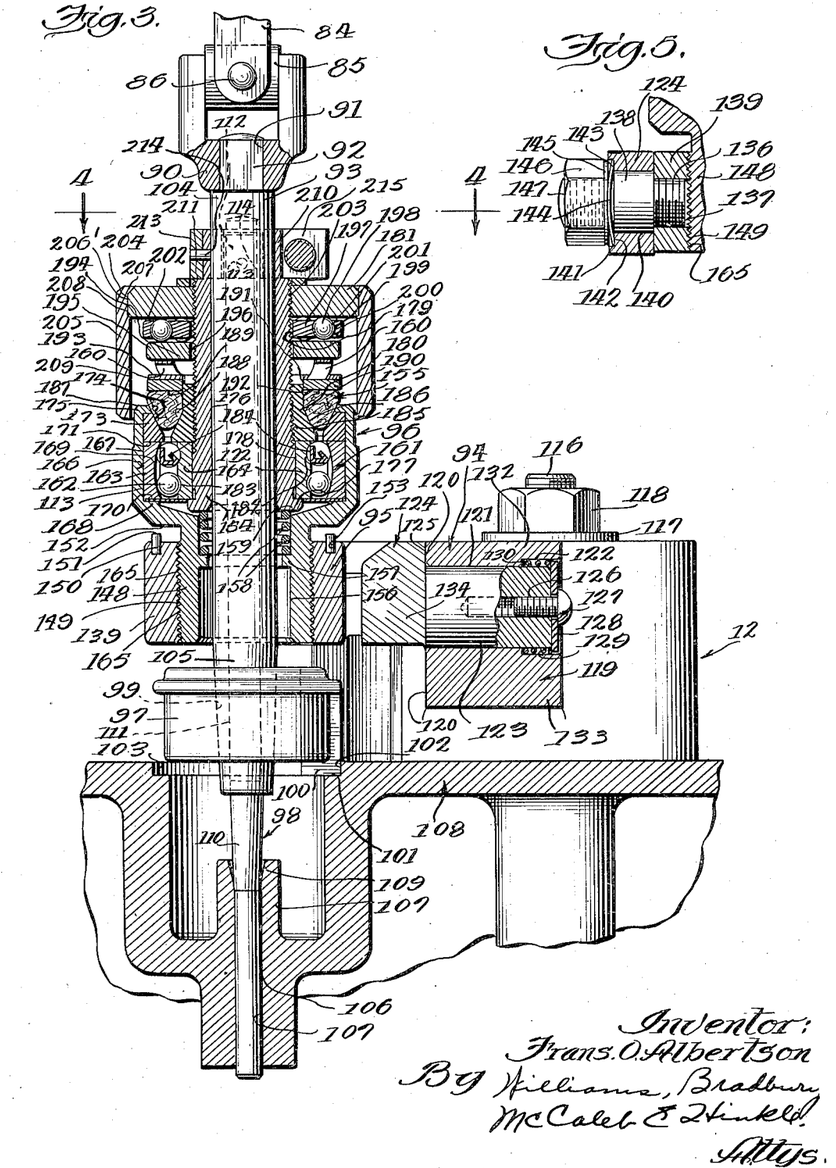
Fig. 3 is an elevational view of the tool fixture in partial section, on a vertical plane with the tool holder, cutter, and pilot in elevation.
Fig. 5 is a fragmentary, sectional view of one of the clamping bolts, taken on the plane of the line 5—5 of Fig. 4.

The clamping members 29 and 30 are provided with aligned bores 41, 42 for receiving the clamping bolt 43, and a helical compression spring 44 between the clamping members on the bolt 43 urges the clamping members apart and facilitates their release from the motor. The bolt 43 is preferably substantially smaller than the bores 41, 42, to permit the pivotal movement of the clamping members 29 and 30 on the bolt 37, and the bolt 43 may be provided with a frustoconical portion 45 adjacent the head for engaging the enlarged bore 41 and centering the bolt. The frusto-conical portion 45 permits a limited pivotal engagement between the lower side of the head 46 and the end of the bore 41. The clamping member 29 is also preferably provided with a transverse groove 47 adjacent bore 41 for receiving the head 46 of bolt 43, and preventing rotation of the head 46. The spring 44 constantly urges the clamping member 29 into engagement with head 46 and maintains the lower portion of head 46 in the groove 47.

At its opposite end, the bolt 43 carries a collar 48 having a frusto-conical surface 49 for engaging in the enlarged bore 42 and permitting a limited pivotal movement between the bolt and clamping member at said frusto-conical surface. The collar 48 is provided with an enlarged bore 50 so that the collar 48 may automatically adjust itself in its engagement with the frustoconical recess 51. The bolt 43 is also provided with a nut 52 for engaging collar 48 and the nut 52 constitutes a force multiplying device for forcing the clamping members 29 and 30 into engagement with the cylindrical portion 35 of the motor casing.

The slot 27 in clamping member 30 comprises a slot of sufficient width to slidably receive the bolt 25, and the slot 27 extends in a radial direction with respect to the center of the clamping surfaces 33, 34, or the axis of chuck 17.

Referring to Fig. 6 the lower casting 21 of the power unit casing 11, is provided with a gear chamber 53 for receiving the spur gears 54, 55, pinions 56, 57 and shafts 58 59 and 60. The casing member 21 may be formed with a cylindrical bore or bearing 61 for receiving the drive shaft 60 and with an inwardly protruding portion of the bearing 62 having a substantially flat end surface 63 for a thrust bearing. The shaft 60 is preferably provided with a reduced end 64 forming an annular shoulder 65 and the reduced end 64 carries the spur gear 54 to which it is keyed by means of a key 65 driven into a slot formed partially in shaft end 64 and partially in the bore of gear 54.

The gear 54 may be provided with a bore 66 and a counter-bore 67, the end 64 of shaft 60 extending merely into the bore 66. The counterbore 67 is provided with an outer race 68 which may be a pressed frictional fit in the counterbore 67 and the reduced end 69 of shaft 59 carries the second race 70. The race 70 also has a pressed frictional fit on the reduced end 69 and the races 68 and 70 are provided with circular grooves 71, 72 arranged to serve both as a thrust bearing and an ordinary ball-bearing. That is, the race 68 has a portion 73 which projects under the balls 74 while the race 70 has a portion 75 which projects over the balls 74. The pinion 57 may consist of an integral part of shaft 59, the shaft 59 being rotatably mounted in a bearing sleeve 76 carried by the casting 22. The upper end 77 of shaft 59 is adapted to be gripped by the chuck 17 of the drill motor 10 to transmit power from the motor to the power drive unit 11.

The casting 22 constitutes a cover for the casing of the power drive unit 11 and is secured to the lower casting 21 by the screw bolts 78 which pass through cover 22 and are threaded into bores 79 in casing member 21. The shaft 58 is rotatably mounted in a bearing 80 formed in cover 22 and in a second bearing 81 formed in casing member 21. The pinion 56 is adapted to mesh with spur gear 54 and may form an integral part of shaft 58, while spur gear 55 is adapted to mesh with pinion 57 and is fixedly secured to shaft 58 by a key or spline 82.

The shaft 60 is provided with forked ends 83, 84, which are adapted to receive between them a pivot block 85, the block 85 being pivotally secured to the ends 83, 84 by a riveted pin 86. The block 85 is provided with reduced cylindrical ends 87 which are pivotally mounted in the bores 88 located in the forked ends 89 of a fitting 90. The reduced ends 87 may consist of pins driven into the bores in the ends of blocks 85 and it will be noted that the pivot 86 is transversely arranged with respect to the pivot 87. The fitting 90 is provided with a non-circular socket 91 adapted to receive the squared end 92 of a tool holder 93.

It will thus be observed that the power drive unit 11 is provided with a universal joint connection between the shaft 60 and the tool holder 93, thereby eliminating the necessity for holding the motor in axial alignment with the tool holder shaft 93. Furthermore, the drive shaft 77 of the power drive unit 11 is supported in the chuck 17 and rotation of the casing 11 is prevented by the bolt 25 which floats in the radially extending groove 27. The bolt 25 is, however, permitted to shift inward or outward of the groove 27 in a radial direction, as the shaft 59 rotates, thereby preventing any binding of the shafts in their bearings, on account of some slight misalignment between the axes of the two casings 13 and 21. The present arrangement permits the use of an ordinary drill motor for driving valve seat tools as the speed reduction accomplished by the power drive unit 11 brings the speed of the shaft 60 down to that required for actuating valve tools.

Figure 4:
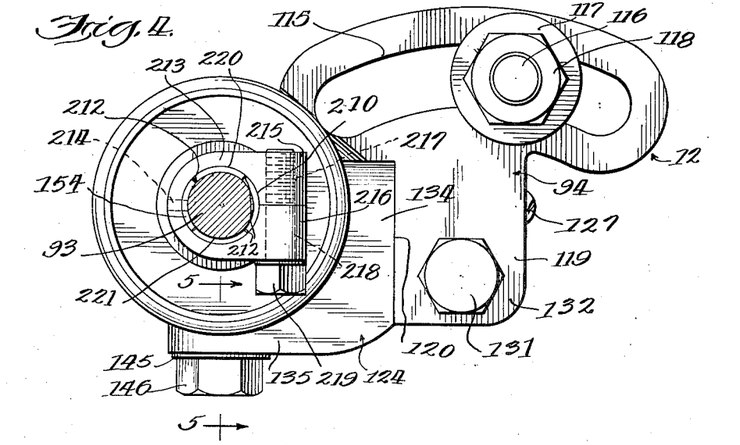
Fig. 4 is a plan view of the valve seat fixture with the tool holder or shaft in section, taken on the plane of the line 4—4 of Fig. 3.

Referring to Figs. 1, 3 and 4, the valve seat tool fixture 12 preferably includes a supporting body 94, a universally adjustable support 95, an automatic feed screw unit 96, tool holder 93, cutter 97 and pilot 98. While the tool is illustrated in connection with the ring recess cutter 97 of the type disclosed in my prior application, Serial No. 536,520, filed May 11, 1931, it should be understood that the present assembly may also be used with valve seat reamers or finishing tools of all kinds.

The cutter 97 is provided with a tapered bore 99 and has a blade 100 fixedly secured in an axially extending slot. The blade 100 is provided with a radially extending cutting edge 101 and an axially extending cutting edge 102 for cutting an annular recess 103 of substantially rectangular cross-section to receive a new valve seat ring as described in my prior applications.

The tool holder 93 comprises a shaft having an elongated cylindrical surface 104 terminating in one end in the non-circular portion 92 and at the other end in the tapered portion 105. The cutter 97 is adapted to be wedged on the tapered portion 105 to secure the cutter on the tool holder.

The pilot 98 is preferably of the type described in my prior application, Serial No. 538,504, filed May 19, 1931, on tapered pilot stems. These tapered pilots are provided with a cylindrical portion 106 adapted to fit the cylindrical valve guide 107 within a tolerance of one-thousandth of an inch, or less, and this fit is accomplished by providing sets of pilots which increase in size by extremely small increments.

The cylindrical portion 106 extends through the major portion of the valve stem guide 107 and is adapted to engage that portion of the valve stem guide intermediate the ends where the guide is still accurately cylindrical. The valve stem guide 107 carried by motor block 108 is generally likely to be rounded out at the point 109 adjacent either end, and therefore the ends of the guide are not adapted to effect accurate, axial location of the pilot, but may be used for securing the pilot fixedly in the block in the present construction.

The pilots 98 are therefore provided with a frusto-conical portion 110 adapted to come into wedging engagement with the upper inner surface of the valve stem guide 107, and this taper is so gradual that the pilot may be fixedly secured in the guide by merely forcing it down and rotating it. The taper, for example, should preferably be about twenty-two-thousandths of an inch per foot, or between the limits of fifteen to thirty-thousandths of an inch taper per foot of length. That is, in the example given, the diameter of the pilot decreases twenty-two thousandths of an inch for each foot of its length.

It should be clearly understood that the centering and location of the pilot stem is accomplished by the cylindrical portion 106, but the pilot stem is secured in position by the gradually tapered wedging portion 110. The pilot 98 is also provided with an upper cylindrical portion 111 terminating in a non-circular end 112 for engagement with wrenches or tools, if desired, and the pilot may be provided with an aperture 113 for receiving a pin to be grasped by the hand in forcing the pilot home in the guide 107.

The tool holder 93 is provided with a complementary cylindrical bore 114 for slidably and rotatably receiving the cylindrical portion 111 of pilot 98, and the cutter 97 is thus supported in accurate axial alignment with the axis of the valve stem guide 107.

The body 94 of the valve seat fixture may comprise a cast metal member which is provided with an elongated curved slot 115 extending vertically through the body 94 for receiving a stud bolt 116 carried by the motor block 108. The curved slot 115 enables the body 94 to be secured in a multiplicity of different positions on the engine block 108 so that provision is made for locating the fixture properly on every modern type of motor block without interference with adjacent studs. The stud 116 is one of the studs ordinarily used for securing the cylinder head in place, and is used with a washer 117 and nut 118 to clamp the body 94 in place.

The body 94 is provided with a laterally projecting lug 119 having a vertically extending flat surface 120. A bore 121 extends through the lug 119 and communicates with a counterbore 122.

The bore 121 is adapted to receive the cylindrical trunnion 123 on a movable supporting body 124, and the movable supporting body 124 is provided with a thrust bearing or annular shoulder 125.

The trunnion 123 is provided with a threaded bore 126 for receiving screw bolt 127 and washer 128 is secured on the end of trunnion 123 by the head of bolt 127. A helical compression spring 129 is compressed between washer 128 and the annular shoulder 130 at the end of counter-bore 122. The spring 129 constantly urges the surfaces 120 and 125 into frictional engagement with each other and holds the trunnion in any predetermined rotative position during its adjustment.

The lug 119 is preferably split or provided with a slot 130' at one side, communicating with the bore 121 throughout its length, and a clamping bolt 131 passes through a bore in the upper half 132 of lug 119, and is threaded into the lower half 133 of lug 119. The bolt 131 is adapted to force the portions 132 and 133 toward each other, clamping the trunnion 123 and fixedly securing the movable body 124 in adjusted position.

The movable body 124 is provided with two portions 134 and 135 at substantially right angles to each other, and the part 135 is provided with a bore 136 having a threaded stud bolt 137 fixedly secured in said bore. The stud bolt 137 is provided with an enlarged cylindrical surface 138, forming a trunnion for the feed screw supporting fixture 139. The body 124 is provided with a bore 140 for receiving the trunnion 138 and with a counter-bore 141 having an annular shoulder 142 for receiving a spring washer 143.

The spring washer 143 may consist of an annular sheet metal member of resilient steel, which is curved laterally at 144 so that it is flexed when the washer 145 is forced into counter-bore 141 by nut 146 on the opposite threaded end 147 of stud bolt 137. The feed screw supporting fixture 139 is thus rotatably mounted on the movable supporting body 124 and provided with friction means for preventing its free rotation and retaining it in any adjusted position. The fixture 139 may, however, be clamped in any adjusted position by threading the nut 146 home on the bolt 137, thereby holding the feed screw 148 in a predetermined position.

The feed screw supporting fixture 139 comprises an annular metal member which is provided with a threaded bore 149 for receiving the feed screw 148. The supporting fixture 139 is provided on its upper surface with one or more gauge pins 150 comprising hardened steel pins having flattened ends 151 for engaging the flat lower surface 152 on the body of the feed screw 148. The pins 150 are fixedly mounted in the fixture 139 by driving them into bores 153 and they are adapted to stop the automatic feed of the feed screw when the cutting operation has proceeded to a predetermined depth.

In order to predetermine the depth of cut, the distance between the flat end 151 and flat annular surface 152 is first predetermined by rotating the feed screw 148 in its supporting fixture 139 until this distance is a predetermined amount, such as, for instance, the depth of a new valve seat ring to be inserted in the recess which is being cut.

It will thus be observed that the feed screw 148 may be adjusted upon the axis of the bolt 137 by adjusting the position of the fixture 139, and it may also be adjusted upon the axis of the trunnion 123 by adjusting the body 124. Both of these adjustable bodies may be fixedly secured in place so that the tool may be adjusted and secured for valve seats extending in any direction with respect to the surface of the motor block.

It should be noted, however, that in the present devices the position of the cutter 97 is predetermined by the pilot 98, which is accurately aligned with the valve stem guide 107, and the automatic feed screw unit 96 is so constructed as to permit a limited universal movement between the bearing for the tool holder 93 and the supporting fixture 94, so that the cutter may adjust itself to the position determined by the pilot stem.

The automatic feed screw unit 96 preferably comprises the feed screw 148, a guide 154 for the tool holder 93, and friction means 155 for connecting these members and permitting a predetermined amount of slippage, whereby the feed screw 148 is driven at a slower rate of rotation than the tool holder 93.

The feed screw 148 may comprise a tubular metal body having an enlarged bore 156 for providing a clearance about the tool holder 93. The bore 156 is provided with an annular shoulder 157 forming a seat for a helical compression spring 158, the other end of which engages the end 159 of guide 154. Spring 158 is adapted to counteract the pressure exerted by springs 160 acting on the opposite side of the self-aligning anti-friction bearings indicated in their entirety by the numeral 161, and thereby adapted to maintain the balls 162 of bearings 161 in constant engagement with the races 163, 164, so as to take up any back-lash in the movement of the tool holder 93 and guide 154. In other words, there is no back-lash or looseness to be taken up by the bearings when the cutter 97 first comes into engagement with the motor block 108 by virtue of the fact that the spring 158 always holds the parts in active engagement, and the depth of the cut may thus be accurately predetermined by having the cutter located in engagement with the surface of the motor block 108 when the feed screw is adjusted.

The feed screw 148 has an outer threaded surface 165 for engaging the threads in bore 149 and above the feed screw supporting fixture 95, the body of the feed screw is enlarged in diameter at 166. The enlarged part 166 of the feed screw is provided with an enlarged bore 167 having an annular shoulder 168 which forms a seat for the outer race 163.

The race 163 comprises a hardened steel annular member having an outer cylindrical surface adapted to be frictionally engaged in the bore 167 and having an annular groove 169 of circular cross-section formed inside the race 163. The radius of curvature of the cross-sectional curve of this groove 169 is located at the axis of the tool holder 93 and substantially midway between the upper and lower surfaces 170, 171 of the race 163. The assembly, including the tool holder 93, guide 154, race 164 and balls 162, is thus adapted to rotate about a multiplicity of axes passing through the point 172, and the tool holder 93 automatically aligns itself with the position of the pilot 98.

The race 163 is engaged at its upper end 171 by the outer clutch ring 173 which comprises a hardened steel member having a substantially cylindrical outer surface adapted to be received in the bore 167, and having an inner frusto-conical surface 174. The race 163 and outer clutch ring 173 are retained in the casing 166 by spinning over the upper end of casing 166 at 175.

The guide 154 comprises a tubular metal member preferably constructed of tool steel and formed with a bore 176 adapted to slidably engage the tool holder 93. The lower end of the guide 154 is engaged by spring 158 and is provided with an annular shoulder 177 adapted to support the inner race 164, which engages the outer cylindrical surface 178 of the guide 154.

Above the cylindrical surface 178, the guide 154 is provided with a threaded surface 179 serving to secure in place the inner clutch ring 180, and also serving as a threaded support for the adjustably mounted pressure ring or thrust bearing 181. The threads 165 of the feed screw 148 are preferably right-hand threads, in order to take advantage of the fact that the drive is taken from that end of the motor, rotating in a right-hand direction, and the same motor which drives the cutter 97 is also employed for driving the automatic feed screw unit 96. The threads on the surface 179 are preferably made left-hand threads in order that the rotation of the tool holder 93 with the thrust bearing or pressure plate 181 may not tend to loosen the pressure on springs 160. That is, there is no tendency for the inertia of the parts in the operation of the device, to cause the adjustable pressure devices to diminish the pressure on the friction feed.

The inner race 164 is preferably provided with one or more annular grooves 182, 183 extending about the periphery of the race 164, and the grooves 182, 183 are also circular in cross-section, the curvature corresponding substantially to the curvature of the balls 162.

The balls 162 are also preferably provided with a retaining device 184 adapted to hold the balls in predetermined spaced position to prevent their coming out of the races 163, 164, and to eliminate the necessity for such a large number of balls as would otherwise be necessary. The grooves 182, 183 provide recesses in which the balls 162 nest, and from which they cannot move in an axial direction, and the anti-friction bearing 161 is thus a self-aligning anti-friction thrust bearing adapted to withstand the thrust which is exerted against the fixture 94 by the reaction from the cutter 97.

The inner race 164 is secured on guide 154 by the inner clutch ring 180 which comprises an annular steel member having an inner threaded surface 185 with left-hand threads for engaging the threads on guide 154. The inner clutch ring 180 is also provided with an outer frusto-conical surface 186, the largest part of which is adapted to be received inside the smallest diameter of the frusto-conical surface 174 on the outer clutch ring 173. Between the clutch rings 173, 180, the frusto-conical surfaces 174, 186 form an annular groove of substantially V-shaped cross-section.

The friction means 186 for causing the feed screw 148 to be driven with tool holder 93 and guide 154, may consist of an annular leather ring comprising a strip of tough leather of substantially triangular cross-section, having its ends joined together by a wire clip. The outer side 187 of the leather ring 155 forms a frusto-conical surface for engagement with the complementary frusto-conical surface 174 on the outer thrust ring 173. The inner side 188 of the leather ring 155 forms an inner frusto-conical surface for frictional engagement with the frusto-conical surface 186 of inner clutch ring 180. The upper surface 189 of the leather ring may be engaged by a pressure ring 190 for driving the leather ring 155 into the groove between the clutch rings 173, 189 and determining the amount of pressure exerted on the clutch, and therefore the amount of slippage between the feed screw and the tool holder.

It should be understood that while a leather clutch facing ring is described, various forms of clutch facing materials may be employed, and various shapes of clutch surfaces may be utilized, but the present specific arrangement has been found to give very good results for a long period of time, with a minimum amount of adjustment and replacement.

The pressure ring 190 comprises an annular steel member having a lower flat surface for slidably engaging the leather ring 155 and having a bore 191 for slidably mounting the pressure ring 190 on the cylindrical portion 192 of the inner clutch ring 180. Upon its upper surface, the pressure ring 190 carries a resilient spring plate 193 which is similar in shape, and which is secured to the pressure plate by a plurality of rivets passing through both of these parts, and the spring plate 193 is provided with a multiplicity of symmetrically located spring tongues 169 which are punched out of the body of the spring plate 193 and bent upward to engage the lower side 194 of a thrust bearing race 195.

The thrust bearing race 195 comprises an annular metal plate formed of hardened steel and having a bore 196 for slidably receiving the threaded guide 154 with a slight clearance. Above the race 195 are located the ballbearing holder 197 and the ballbearings 198. The ballbearing holder 197 may consist of an annular metal member of bearing metal formed with a plurality of staggered spherical recesses 199 for receiving the balls 198.

The recesses 199 may comprise bores having a smaller opening 200 at one side for preventing the balls 198 from passing through, and having the metal adjacent the opening 201 at the other side, spun over to decrease the size of the opening of the bore at that side and retain the ball in the recess 199. The balls 198 project beyond the flat surfaces of the retaining ring 197 at the top and bottom, and are adapted to engage the lower race 195 on one side and the flat surface 202 of the pressure adjustment ring 181 on the other side, the latter surface also performing the function of an upper race.

The pressure adjustment ring 181 comprises an annular metal member preferably constructed of tool steel and provided with a centrally located bore 203 having left-hand threads for engaging the threads on guide 154. The outer cylindrical surface 204 of the pressure adjustment member carries a tubular skirt or casing member 205, the outer surface 206 of which is preferably knurled as shown in Fig. 1, for convenient grasp with the hand in adjusting the spring pressure on the friction device.

The tubular casing 205 may be provided with an enlarged bore 206′ for receiving the annular member 181 and the upper end of the tubular member 205 may be spun over at 207 to clamp the annular member 181 between the shoulder 208 and the spun end 207. Tubular member 205 should preferably be long enough to extend down to the casing 166 and the bore 209 should be large enough to receive the casing 166 as the pressure member is threaded downward on the guide 154.

The guide 154 is provided with an upper end portion 210 of reduced diameter forming an annular shoulder 211, and the upper end 210 is preferably provided with a multiplicity of slots 212 uniformly spaced about the periphery of the end 210 and extending axially into the end. A clamping member 213 fits about the reduced end 210, and is preferably provided with a pin 214 extending through a bore in the clamping member 213 and end 210 to prevent relative rotation between the clamping member and the guide 154.

The clamping member 213 is provided with a pair of laterally projecting lugs 215, 216, the former of which is provided with a threaded bore 217, and the latter with an ordinary circular bore 218. A clamping bolt 219 extends through the bore 218 and is threaded into the bore 217 and the head of bolt 219 draws the lugs 215 and 216 together to reduce the size of the bore 220 in clamping member 213. The relationship of the parts should be such that when the bolt 219 is threaded home, the member 213 clamps the split portions 221 of the end 210 together on the tool holder 93 and fixedly secures the tool holder 93 to the guide 154.

The method of manipulation, and the operation of the present apparatus is as follows. A pilot stem 98 is selected which will most closely fit in the valve stem guide 107, and this fit can be accomplished by selecting the appropriate pilot stem from the set of pilots described in my prior application, in which the sizes vary by extremely small increments from the standard measurements for guides. By means of these cylindrical pilot stems adapted to fit in the guides, the pilot may be selected which will be accurately centered in the guide by that portion of the guide which is intermediate its ends, and which is still substantially cylindrical in form, as distinguished from the ends of the valve stem guide which are apt to be rounded out.

The pilots described are provided with a tapered portion of such gradual taper that the pilot is adapted to be wedged into the guide at the upper end and fixedly secured in the guide solely by the wedging action of the frusto-conical or gradually tapered portion of the pilot.

The clamping bolt 131 is first loosened and the clamping nut 146 is loosened so that the body of the tool may move freely with respect to the automatic feed unit and tool holder, and the bottom of the body may be brought into parallelism with the upper surface of the motor block.

The appropriate cutter 97 is then placed upon the tool holder 93, the tool holder is slid upward into the bore of guide 154, and the complete fixture, including the supporting base 94, is secured to the engine block by sliding the tool holder down over the cylindrical portion 105 of the pilot and simultaneously placing the body 94 over one of the stud bolts on the motor block. The nut 118 is then used to secure the body 94 to the motor block, and while this is being done, the guide 154 and tool holder 93 are caused to take a position of alignment with respect to the axis of the valve stem guide between pilot 98. The position of the cutter 97 is determined wholly by the valve stem pilot 98.

The nut 146 and bolt 131 may then be threaded home to secure the movable bodies 124 and 95 in the position which they have taken, and assuming that it is proposed to cut a recess for a new valve seat ring, the feed screw should now be adjusted for a cut of the proper depth, as follows.

All the lower edge 101 of the cutter blade 100 is permitted to rest on the top of the motor block, and the feed screw 148 is turned upward or downward in its supporting member 95 until the flat surface 152 is spaced from the end 151 of the gauge pins 150 by an amount which is equal to the depth of the ring to be inserted in the recess. This can be determined by holding the ring on one of the pins 150.

After the feed screw has been moved to this position, the clamping member 213 is tightened by means of the bolt 219, and the guide 154 is thus fixedly secured to the tool holder 93, and, of course, to the cutter 97, which is fixedly mounted on the tool holder. The tool holder 93 may then be actuated either by hand, with appropriate tools, such as a ratchet wrench or by using the power drive unit and the motor previously described, by placing the socket 91 on the non-circular end 92 of tool holder 93.

The operation of the device under these conditions is as follows. The motor 10 is driven at a relatively high speed due to the natural characteristics of motors of this type, but the speed at the chuck 17 is reduced by the speed reducing mechanism to a speed appropriate for drills. The power drive unit 11 further reduces the speed at the tool holder 93 to that appropriate for valve seat cutting operations, and the motor is thus adapted to drive the tool holder 93 at an appropriate speed.

During this operation, the universal joint above the end of the tool holder 93 (Fig. 1) permits the holding of the motor in any appropriate position, and access may be had to valves located in practically any position on modern internal combustion engines. It is not necessary to exert any pressure on the cutter by means of the handles of the motor for the reason that the tool fixture 12 is fixedly secured to the motor block, and the automatic feed screw unit 96 is adapted to automatically maintain a constant pressure on the cutter and feed the cutter at the proper rate with regard to the motor block.

As the tool holder 93 rotates, it carries with it the cutter 97 and the guide 154. The guide 154 carries with it the inner clutch ring 180 and the position of the guide 154 is determined wholly by the pilot 98. It should be noted that the guide 154 is mounted for a limited universal movement by virtue of the construction of the anti-friction bearing 161, the balls 162 of which may move upward or downward in the outer race 163. It should also be noted that there is a clearance between the end of the guide 154 and the feed screw 148, and a clearance between the respective clutch rings 173, 180. The respective clutch rings are, of course, in engagement with the leather ring 155, but the shape of these parts and the flexibility of the leather is such that a slight universal movement is permitted at this point.

The cutter 97 is thus guided entirely by the pilot 98 so that it may cut an accurately annular recess 103, the axis of which is identical with the axis of the valve stem guide 107. The cutter reacts against tool holder 93, which reacts against guide 154, which in turn reacts against the anti-friction bearing 161 and against the valve tool body 94 in a vertical direction.

The feed screw 148 is adapted to be driven also by the tool holder 93, for the reason that the outer clutch ring 173 carried by feed screw 148, is in frictional engagement with the leather ring 155, which is in turn engaged by the inner clutch ring 180. The leather ring 155 is subjected to resilient pressure by the springs 160 and this pressure may be adjusted by moving the pressure adjustment member 181 upward or downward upon the threaded guide 154.

It is relatively immaterial where the slippage occurs with respect to the leather ring 155, and the leather ring may slip with respect to the clutch ring 180 or clutch ring 173, or the pressure member 190. There is no possibility for the leather ring to bind with respect to the upper pressure ring 190 and carry the pressure adjustment member 181 along with it for the reason that the ball bearings 198 are interposed between the pressure adjustment member 181 and the race 195.

The feed screw 148 is thus rotated at a rate which is predetermined by the amount of slippage at the leather ring 155 and this slippage may be accurately determined by the spring pressure on the leather ring. The clutch pressure may be set at the factory when the device is inspected, and need only be taken up slightly from time to time as it appears desirable to rotate the feed screw at a higher rate. A low rate of rotation of the feed screw is desirable, because this prevents overworking the cutter.

The rotation of the feed screw 148, of course causes the feed screw to progress downward in its supporting ring 95, thereby feeding downward the guide 154, tool holder 93 and cutter 97 until the pins 150 engage flat surface 152. No further downward motion of the feed screw being possible, the feed screw is positively held and full slippage must occur at the leather ring 155 so that no particular harm is done if the motor is operated for a few moments after the cutter has cut the predetermined depth. The depth of cut is automatically stopped by the automatic feed screw unit when the proper depth is reached. The other steps necessary to finish the reconstruction of the valve set are described in my prior application above mentioned.

It will thus be observed that I have invented an improved valve seat tool, by means of which valve seat work may be done with a minimum amount of manual labor. The applicant's drill motor may be used for valve seat cutting operations, as well as drilling operations by means of the improved power drive unit described herein, and the provision of the automatic feed screw unit enables the cutting of recesses for valve seat rings without the necessity for manually feeding the cutter. The proper adjustments having been made, the motor may be turned on and the recess is cut automatically in an extremely short time.

The present valve seat tools are capable of cutting recesses or otherwise finishing valve seats more accurately than the devices of the prior art by virtue of the fact that the cutter is perfectly aligned with the best portion of the valve stem guide, and this alignment is accomplished within closer limits than any of the devices of the prior art, as shown by test with the valve seat gauges which are described in one of my prior applications.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a valve seat working apparatus, the combination of a supporting fixture adapted to be secured to an internal engine block, said supporting fixture having a threaded part for support of a feed screw unit, an automatic feed screw unit comprising a tubular body having a threaded surface for engagement with a supporting body, a bearing mounted in said tubular body, a guide carried by said bearing, and co-operating clutch members carried by said guide and said tubular member, whereby said guide is adapted to drive said tubular member at a reduced rate of speed.

2. In a valve seat working apparatus, the combination of a supporting fixture adapted to be secured to an internal engine block, said supporting fixture having a threaded part for support of a feed screw unit, an automatic feed screw unit comprising a tubular body having a threaded surface for engagement with a supporting body, a bearing mounted in said tubular body, a guide carried by said bearing, cooperating clutch members carried by said guide and said tubular member, whereby said guide is adapted to drive said tubular member at a reduced rate of speed, and means for adjusting the pressure on said cooperating clutch members to determine the rate of drive of said tubular member.

3. In an automatic feed screw unit, the combination of a supporting body having an externally threaded cylindrical surface for engagement with a fixture, a sleeve rotatably mounted with respect to said body, said sleeve and body having aligned bores, anti-friction bearings interposed between said sleeve and body, a pair of opposed frusto-conical members carried by said sleeve and body, said frusto-conical members being tapered in opposite directions forming a tapered groove, a tapered annular member mounted for engagement in said groove to slidably connect said sleeve and body for rotation together, and a tool holder slidably adjustable with respect to said sleeve and fixedly secured to said sleeve whereby said body is rotated at a slower rate than said tool holder to feed a tool carried by said tool holder.

4. In an automatic feed screw unit, the combination of a supporting body having an externally threaded cylindrical surface for engagement with a fixture, a sleeve rotatably mounted with respect to said body, said sleeve and body having aligned bores, anti-friction bearings interposed between said sleeve and body, a pair of opposed frusto-conical members carried by said sleeve and body forming a tapered groove, a tapered annular member mounted for engagement in said groove to slidably connect said sleeve and body for rotation together, and a tool holder slidably adjustable with respect to said sleeve and fixedly secured to said sleeve whereby said body is rotated at a slower rate than said tool holder to feed a tool carried by said tool holder, and resilient means for engaging said V-shaped annular member and urging it into said groove.

5. In an automatic feed screw unit, the combination of a supporting body having an externally threaded cylindrical surface for engagement with a fixture, a sleeve rotatably mounted with respect to said body, said sleeve and body having aligned bores, anti-friction bearings interposed between said sleeve and body, a pair of opposed frusto-conical members carried by said sleeve and body forming a tapered groove, a tapered annular member mounted for engagement in said groove to slidably connect said sleeve and body for rotation together, and a tool holder slidably adjustable with respect to said sleeve and fixedly secured to said sleeve whereby said body is rotated at a slower rate than said tool holder to feed a tool carried by said tool holder, and resilient means for engaging said V-shaped annular member and urging it into said groove, a threaded member carried by said sleeve for adjusting the tension on said resilient means, and an anti-friction thrust bearing between said threaded member and said resilient means.

6. In an automatic feeding mechanism, the combination of a supporting member with a threaded feed screw carried thereby, a tool holder, a tool carried by said tool holder and adapted to be fed toward the work by said feed screw, a tapered annular member carried by said tool holder and having an outer tapered surface, a second tapered annular member carried by said feed screw and having an inner tapered surface tapering in a direction opposite to the said outer tapered surface, said inner and outer tapered surfaces being arranged in juxtaposition to bound an annular space which is of tapered shape when viewed in a section taken on a plane passing through the axis of the tool holder, and a tapered annular friction member floatingly mounted in said annular space and adapted to slidingly transmit power from the annular member carried by the tool holder to the annular member carried by the feed screw to drive the feed screw at a reduced speed.

7. In an automatic feeding mechanism, the combination of a supporting member with a threaded feed screw carried thereby, a tool holder, a tool carried by said tool holder and adapted to be fed toward the work by said feed screw, a tapered annular member carried by said tool holder and having an outer tapered surface, a second tapered annular member carried by said feed screw and having an inner tapered surface tapering in a direction opposite to the said outer tapered surface, said inner and outer tapered surfaces being arranged in juxtaposition to bound an annular space which is of tapered shape when viewed in a section taken on a plane passing through the axis of the tool holder, and a tapered annular friction member floatingly mounted in said annular space and adapted to slidingly transmit power from the annular member carried by the tool holder to the annular member carried by the feed screw to drive the feed screw at a reduced speed, said friction member comprising a leather ring of substantially V-shape.

8. In an automatic feeding mechanism, the combination of a supporting member with a threaded feed screw carried thereby, a tool holder, a tool carried by said tool holder and adapted to be fed toward the work by said feed screw, a tapered annular member carried by said tool holder and having an outer tapered surface, a second tapered annular member carried by said feed screw and having an inner tapered surface, said inner and outer tapered surfaces being arranged in juxtaposition to bound an annular space which is of tapered shape when viewed in a section taken on a plane passing through the axis of the tool holder, a tapered annular friction member floatingly mounted in said annular space and adapted to slidingly transmit power from the annular member carried by the tool holder to the annular member carried by the feed screw to drive the feed screw at a reduced speed, and resilient means for urging said friction member into said annular space.

9. In an automatic feeding mechanism, the combination of a supporting member with a threaded feed screw carried thereby, a tool holder, a tool carried by said tool holder and adapted to be fed toward the work by said feed screw, a tapered annular member carried by said tool holder and having an outer tapered surface, a second tapered annular member carried by said feed screw and having an inner tapered surface, said inner and outer tapered surfaces being arranged in juxtaposition to bound an annular space which is of tapered shaped when viewed in a section taken on a plane passing through the axis of the tool holder, a tapered annular friction member floatingly mounted in said annular space and adapted to slidingly transmit power from the annular member carried by the tool holder to the annular member carried by the feed screw to drive the feed screw at a reduced speed, and resilient means for urging said friction member into said annular space, said resilient means reacting against a shoulder supported by said tool holder.

10. In an automatic feeding mechanism, the combination of a supporting member with a threaded feed screw carried thereby, a tool holder, a tool carried by said tool holder and adapted to be fed toward the work by said feed screw, a tapered annular member carried by said tool holder and having an outer tapered surface, a second tapered annular member carried by said feed screw and having an inner tapered surface, said inner and outer tapered surfaces being arranged in juxtaposition to bound an annular space which is of tapered shape when viewed in a section taken on a plane passing through the axis of the tool holder, a tapered annular friction member floatingly mounted in said annular space and adapted to slidingly transmit power from the annular member carried by the tool holder to the annular member carried by the feed screw to drive the feed screw at a reduced speed, resilient means for uging said friction member into said annular space, said resilient means reacting against a shoulder supported by said tool holder, and an anti-friction bearing means interposed between said shoulder and said resilient means.

FRANS O. ALBERTSON.